United States Patent [19]

Kubotera et al.

[11] Patent Number: 4,971,021

[45] Date of Patent: Nov. 20, 1990

[54] APPARATUS FOR CUTTING SEMICONDUCTOR CRYSTAL

[75] Inventors: Yutaka Kubotera, Yokohama; Kazunari Akiyama, Kawasaki, both of Japan

[73] Assignee: Mitsubishi Kinzoku Kabushiki Kaisha, Tokyo, Japan

[21] Appl. No.: 223,802

[22] Filed: Jul. 25, 1988

[30] Foreign Application Priority Data

Jul. 31, 1987 [JP] Japan .................. 62-192472
Jul. 31, 1987 [JP] Japan .................. 62-192473
Jul. 31, 1987 [JP] Japan .................. 62-192474

[51] Int. Cl.$^5$ ........................................... B23Q 17/09
[52] U.S. Cl. ................. 125/13.01; 125/13.02; 83/522.15; 83/522.16
[58] Field of Search .................. 83/72, 73, 522.15, 62, 83/76.6, 76.7, 76.9, 522.16, 522.27, 522.14; 364/474.17, 474.19; 73/660; 51/165.75, 165.77; 125/13.01, 13.02

[56] References Cited

U.S. PATENT DOCUMENTS

| | | | |
|---|---|---|---|
| 3,681,978 | 8/1972 | Mathias et al. | 73/660 |
| 3,895,358 | 7/1975 | Pearl | 83/76.9 |
| 3,986,010 | 10/1976 | Lankford et al. | 364/474.17 |
| 4,498,345 | 2/1985 | Dyer et al. | 73/849 |
| 4,531,436 | 7/1985 | Antonissen | 83/68 |
| 4,653,361 | 3/1987 | Zobeli | 82/48 |

OTHER PUBLICATIONS

IBM Technical Disclosure Bulletin, vol. 25, No. 5 (Oct. 1982), (2 pages).

Primary Examiner—Paul A. Bell
Assistant Examiner—John M. Husar
Attorney, Agent, or Firm—Scully, Scott, Murphy & Presser

[57] ABSTRACT

An apparatus for cutting a semiconductor crystal ingot into wafers includes a rotary blade, a first sensor, a second sensor and a computing unit. The blade is of a generally disk shape having a mark put thereon. The first sensor is stationarily located in opposed relation to the blade for sensing a distance between the blade and the first sensor to produce a first signal representative of the distance. The second sensor is stationarily disposed in opposed relation to the blade for detecting the mark of the blade to produce a second signal representative of a position of the mark. The computing unit is connected to the first and second sensors for receiving the first signal from the first sensor in synchronization with the second signal from the second sensor, and computing an amount of warp of the blade as to a fixed position thereof by using the received first signal.

7 Claims, 1 Drawing Sheet

APPARATUS FOR CUTTING SEMICONDUCTOR CRYSTAL

BACKGROUND OF THE INVENTION

1. Field of the Invention

The present invention relates to an apparatus for cutting a semiconductor single-crystal rod transversely to wafers by means of an inside diameter rotary blade or saw.

2. Prior Art

One conventional cutting apparatus of the aforedescribed type comprises a distance measuring device for sensing a warp of the blade caused during the cutting operation. Results of the measurement as to such warp are used, for instance, as data for computing the cross-sectional configuration of the wafers sliced from the rod-like ingot to judge their quality.

The distance measuring device is provided with a sensing head or sensor stationarily located in a fixed position opposed to one of opposite faces of the blade, and is operable to successively measure and compare the distances from the sensing head to the blade which momentarily vary due to the warp of the blade, to thereby sense the warp of the blade.

The timing for the sensing of the distance measuring device has been hitherto set so that the sensing is effected at predetermined regular time intervals. In other words, assuming that an annular portion of the one face of the blade to be opposed to the sensing head is uniformly planar, the distance between the sensing head and the annular portion has been measured at regular time intervals. As a result, that portion of the blade opposed to the sensing head at a prescribed timing has not been brought into an opposed relation to the sensing head at the next timing.

In an actual blade, however, such annular portion of the blade is not uniformly planar due to the orientation caused in the blade when it is formed by rolling. More specifically, the elongation of the blade measured in a direction of the rolling is different from that of the blade measured in a direction perpendicular to the rolling direction. Consequently, when mounted on a rotating head and stretched outwardly, the blade is subjected to such a warp that that intermediate portion of the one face disposed between inner and outer peripheral portions protrudes therefrom, and that the direction of warping in the direction of the rolling is reverse to that in the direction perpendicular to the rolling direction. Besides, the degree of the warping varies from blade to blade. The blade is thus subjected to an intricate warp and thereby to deflection or runout when rotated. Accordingly, the precision of the measurement as to the warp of the blade has been low unduly, thereby adversely affecting the judgment of the quality of the wafers sliced from the ingot.

SUMMARY OF THE INVENTION

It is therefore an object of the present invention to provide an apparatus for cutting a semiconductor crystal which can measure the warping of an inside diameter blade with a higher precision to thereby provide reliable information suitable for monitoring the slicing operation.

According to the present invention, there is provided an apparatus for cutting a semiconductor crystal ingot, comprising a rotary blade of a generally disk shape; position indicating means for indicating a position corresponding to a prescribed point on the blade; a first sensor stationarily located in opposed relation to the blade for sensing a distance between the blade and the first sensor to produce a first signal representative of the distance; a second sensor disposed in opposed relation to the blade for detecting the position of the position indicating means to produce a second signal representative of the point on the blade; and computing means connected to the first and second sensors for receiving the first signal from the first sensor in synchronization with the second signal of the second sensor, and computing an amount of warp of the blade as to a fixed position thereof by using the received first signal.

DESCRIPTION OF THE PREFERRED EMBODIMENTS OF THE INVENTION

Figure 1:
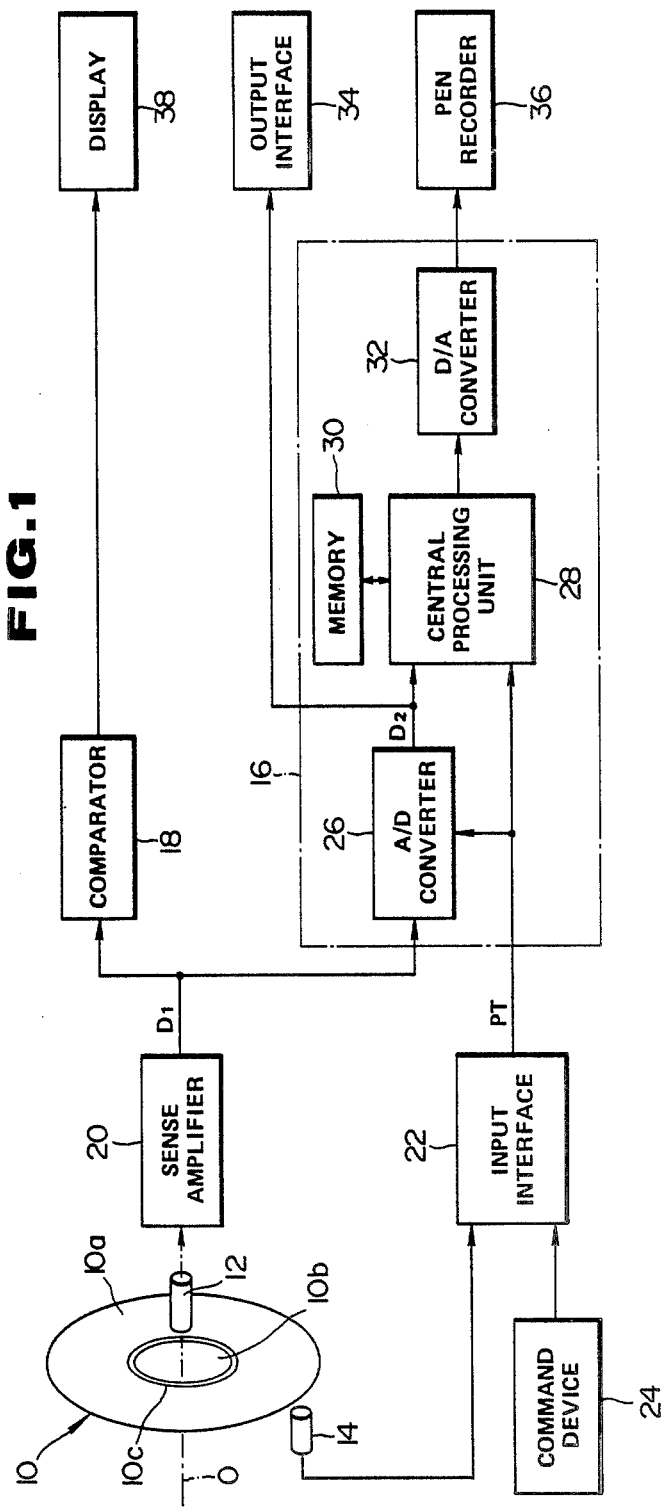
FIG. 1 is a block diagram depicting an apparatus for cutting a semiconductor crystal in accordance with the present invention.
Figure 2:
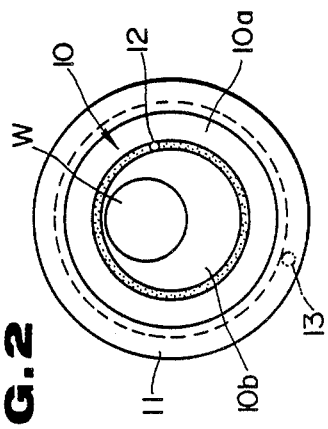
FIG. 2 is a front view of an inside diameter rotary blade held by a spindle of the apparatus of FIG. 1.

Referring to FIGS. 1 and 2, there is illustrated a cutting apparatus in accordance with the present invention which comprises an inside diameter rotary blade 10, a distance sensor or first sensor 12, a rotation sensor or second sensor 14, computing means 16 and a comparator 18. The rotary blade 10 includes an annular thin body 10a having a central opening 10b and abrasive grains deposited on an inner periphery of the body 10a for serving as an inner peripheral cutting edge 10c. The blade 10 is fixedly secured to a spindle or rotary chuck 11 so that it can be rotated at a high speed about an axis 0 thereof. A recess serving as a mark 13 is formed in a rearward end face of the rotary chuck 11 so that it corresponds to a prescribed point or position on the blade 10. A semiconductor single-crystal ingot W is adapted to be introduced into the opening 10b of the annular blade 10 in a direction perpendicular to the blade 10, and to be then moved transversely upwardly by a feed machine (not shown), so that the crystal ingot W can be brought into cutting engagement with the inner peripheral cutting edge 10c and can be cut transversely into thin slices i.e. wafers.

The first sensor 12, which is, for example, comprised of an eddy-current sensor, is stationarily located in a fixed position opposed to the inner peripheral portion of the front face of the blade 10, and is operable to magnetically sense the distance between the sensor 12 and the blade 10 to produce a first analog signal representative of the distance. The sensor 12 is connected through a sense amplifier 20 to the computing means 16 and to the comparator 18. The sense amplifier 20 includes a low-pass filter therein for filtering the signal from the first sensor 12 and is operable to produce an analog signal $D_1$ without noise.

The second sensor 14 is immovably located in a fixed position opposed to the rear face of the blade 10 for detecting the mark 13 on the chuck 11 as the blade 10 rotates, to produce second output signals at regular time intervals. The sensor 14 may also be comprised of an eddy-current sensor which senses a change in an eddy current induced when the mark 13 of the chuck 11 is brought into a position exactly opposed thereto. The second sensor 14 is connected to the computing means 16 through an input interface 22 which is provided with gates for the sensor 14 and transforms the second output signals from the sensor 14 into a series of timing pulses PT. Connected to the input interface 22 is command means 24 for supplying the input interface 22 with command signals to open the gates to permit the second signals to pass therethrough. Such command means 24 may be comprised of an electric circuit which automatically produces the command signals every time the cutting of the ingot W into one slice is started, or a switch which is to be operated every time the cutting of the ingot into one slice is started.

The computing means 16 comprises an analog-to-digital converter 26 connected to the sense amplifier 20 and the input interface 22, a central processing unit 28 connected to the analog-to-digital converter 26 and to the input interface 22, a memory 30 attached to the processing unit 28, and a digital-to-analog converter 32 connected to the processing unit 28. The analog-to-digital converter 26 is operable to receive the analog signal $D_1$ from the sense amplifier 20 in synchronization with the timing pulses PT inputted thereto through the interface 22 and to translate the received analog signal $D_1$ into discrete digital signals or data $D_2$. The memory 30 stores as initial data the digital signals $D_2$ obtained at the beginning of the cutting operation, and the central processing unit 28 operates to retrieve the initial data from the memory 30 and to compare the initial data with the signals subsequently inputted from the analog-to-digital converter 26, in synchronization with the timing pulses PT inputted thereto through the interface 22, to produce digital signals representative of the warp of the blade 10 in sequence. More specifically, the central processing unit 28 compares the initial data with the data $D_2$ subsequently generated from the analog-to-digital converter 26 to consecutively produce digital signals indicating the differences between the data, i.e., the displacements in the distance between a fixed position on the blade 10 and the sensor 12.

The analog-to-digital converter 26 is further connected through an output interface 34 to an external device (not shown) which may be, for example, an apparatus for computing the cross-sectional configuration of the wafers based on the data as to the warping of the blade 10 to judge the quality of the wafer. The digital-to-analog converter 32, which translates the digital data from the central processing unit 28 into analog data, is further connected to recording means such as a pen recorder 36 wherein the analog data converted by the digital-to-analog converter 32 are recorded on a chart. It is preferable that such recorder is provided with a stopping mechanism for automatically stopping the feed of the paper when the cutting of the ingot by the blade 10 is not effected.

The comparator circuit 18 is provided for receiving the analog signal $D_1$ from the sense amplifier 20 and judging whether the position of the first sensor 12 is within a prescribed range, to provide information as to the position of the sensor 12. More specifically, the first sensor 12 has to be intrinsically fixed to a stationary position since its position in itself serves as a reference point. It is, however, inevitable that the sensor 12 undergoes some shifting In view of this, the admissible range of the distance between the sensor 12 and the blade 10 is divided into five ranges or phases comprised of an optimal range, two plus-side ranges wherein the distance is greater than the optimal range, and two minus-side ranges wherein the distance is smaller than the optimal range, and these five reference ranges are set in advance in the comparator 18. And, the comparator 18 determines which reference range out of these five the distance actually measured by the first sensor 12 is contained in.

The comparator circuit 18 thus constituted is connected to a display device 38 such as a light-emitting diode for selectively displaying one of five images corresponding to the above five ranges.

The operation of the cutting apparatus will now be described.

The single-crystal ingot W is first positioned in a prescribed cutting position and then the command signals to start the cutting operation is outputted by the command device 24 to the input interface 22 after the rotation of the blade 10 is commenced. The interface 22, in turn, opens the gates for the second sensor 14, so that the timing pulses PT are outputted therethrough every time the second sensor 14 detects the mark 13 of the chuck 11.

The first sensor 12 continuously senses the distances between the sensor 12 and the blade 10 and produces analog signals. The analog signals are comprised of analog data as to the distance which is varying due to the warp and deflection of the blade, a ripple component of the noise in a power source, and other disturbances, and are filtered off through the low-pass filter of the sense amplifier 20, so that the analog signals $D_1$ without noise are outputted in sequence to the comparator circuit 18 and the analog-to-digital converter 26.

In the comparator 18, the distance measured by the first sensor 20 is compared with the prescribed five reference ranges, and it is determined which range the measured distance is contained in. And, the range thus determined is sequentially outputted to the display 38 and indicated thereon. Accordingly, while watching the display 38 during the cutting operation, the operator can easily confirm whether the position of the first sensor 12 is precise or not.

The analog signals $D_1$ outputted from the sense amplifier 20 are further received by the analog-to-digital converter 26 in synchronization with the timing pulses PT inputted from the input interface 22 thereto, and are translated into the digital signals $D_2$. And, the data initially obtained at the beginning of the cutting operation, i.e., the data obtained immediately after the command signals are inputted to the input interface 22, are stored in the memory 30 as the initial data. Thereafter, in the central processing unit 28, the initial data are retrieved from the memory 30 and compared with the data $D_2$ subsequently inputted thereto in sequence, so that the digital data representative of the differences are produced. Specifically, the signals indicating the differences between the initial data and the data $D_2$ produced later are outputted in sequence. The digital data obtained are then converted by the digital-to-analog converter 32 into analog signals and recorded by the recorder 36.

The data thus obtained are regarded as ones measured for a fixed point on the blade 10 since they are obtained in synchronization with the timing pulses PT produced from the second sensor 14. Accordingly, the measurement of the warp of the blade can be effected with a higher precision without being adversely affected by the orientation of the blade 10.

Further, the digital signals $D_2$ from the analog-to-digital converter 26 are inputted through the output interface 34 to a judging apparatus, for example. In such a case, too, the signals can be used as very reliable data for judging the quality of the wafers since they are not influenced by the run-out of the blade 10.

In the cutting apparatus as described above, by virtue of the provision of the second sensor 14, the data indicating the distance as to a fixed position on the blade 10 can be selectively obtained, and therefore the warp of the blade 10 can be computed with a very high precision. In addition, since the command device 24 supplies the computing means 16 with the command signal every time the cutting of the ingot into one slice is commenced, the initial data used for computing the warp of the blade are produced every time the cutting of the ingot into one slice is commenced. Therefore, even though the blade 10 is subjected to elongation or the like due to the cutting operation over a prolonged period of time, the precision of the measurement can be maintained high and no adjustment is required.

Further, in the cutting apparatus as described above, when the blade 10 is subjected to breakage and its fragments impinge against the first sensor 12, the first sensor 12 might be shifted from its prescribed fixed position. In a prior art cutting apparatus, the operator had to locate the sensor again while checking the position of the sensor with a scale. Such work has been very laborious and time-consuming because the operator has to check the position of the sensor with his eyes, and besides has lowered the operating rate of the cutting apparatus markedly. In the above cutting apparatus, however, the position of the first sensor 12 can be easily adjusted while checking its position on the display 38. More specifically, as is the case with a usual cutting operation, the position of the first sensor 12 is detected by the comparator circuit 18 and indicated on the display 38. The operator can, therefore, easily locate the sensor in position while checking its position on the display 38.

While the cutting apparatus according to the present invention has been specifically shown and described herein, the invention itself is not to be restricted by the exact showing of the drawings or the description thereof. For example, although in the above embodiment, only one mark 13 is put on the chuck 11, a plurality of, say six or twelve, marks may be put thereon in circumferentially equally spaced relation to one another. In the case where a plurality of marks are put on the chuck, the output signals from the first sensor 12 may be divided so that only one signal can be utilized at regular time intervals for each rotation of the blade. The mark may be directly put on the blade 10 instead of the rotary chuck 11. Further, although the mark is comprised of a recess in the above embodiment, it may be comprised of a projection.

What is claimed is:

1. An apparatus for cutting a semiconductor crystal, comprising:
    a rotary blade of a generally disk shape including an inside diameter saw having abrasive grains deposited along an inner periphery thereof;
    rotary chuck means fixed holding said blade for rotation therewith;
    position indicating means for indicating a position corresponding to a prescribed point on said blade, said position indicating means consisting of a mark on said rotary chuck means;
    a first sensor stationarily located in opposed relation to said abrasive grains on said blade for sensing a distance between said blade and said first sensor to produce a first signal representative of said distance;
    a second sensor stationarily disposed in opposed relation to said rotary chuck means for detecting said position of said position indicating means to produce a second signal representative of said prescribed point on said blade;
    computing means connected to said first and second sensors for receiving said first signal from said first sensor in synchronization with said second signal from said second sensor, and computing an amount of warp of said blade as to a fixed position thereof by using said received first signal, said computing means including a memory for storing as initial data said first signal initially inputted from said first sensor, and processing means for retrieving said stored initial data from said memory and comparing said initial data with said first signal subsequently imputted from said first sensor to thereby calculate said amount of warp of said blade;
    command means connected to said computing means for producing a command signal to start the cutting operation, and inputting said command signal to said computing means to cause said computing means to receive said first signal from said first sensor after said command signal is inputted thereto; and
    recording means connected to said computing means for recording the amount of warp computed in said computing means.

2. An apparatus according to claim 1, in which said first sensor is comprised of an eddy-current sensor for producing an analog signal serving as said first signal.

3. An apparatus according to claim 1, in which said inside diameter saw includes a recess formed in one of opposite faces thereof and serving as said position indicating means.

4. An apparatus according to claim 1, in which said second sensor is comprised of an eddy-current sensor for producing a series of timing pulses each serving as said second signal.

5. An apparatus according to claim 4, in which said computing means comprises an analog-to-digital converter for receiving said analog signal from said first sensor in synchronization with said timing pulses from said second sensor and translating said received analog signal into a digital signal.

6. An apparatus according to claim 1, wherein comparator means is connected to said first sensor for receiving said first signal from said first sensor and determining whether the position of said first sensor relative to said blade is within a prescribed range to provide information as to the position of said first sensor.

7. An apparatus according to claim 6, wherein display means is connected to said comparator means for displaying said information as to the position of said blade.

* * * * *